B. F. FORD.
COVER FASTENER.
APPLICATION FILED FEB. 12, 1912.
1,073,482.
Patented Sept. 16, 1913.
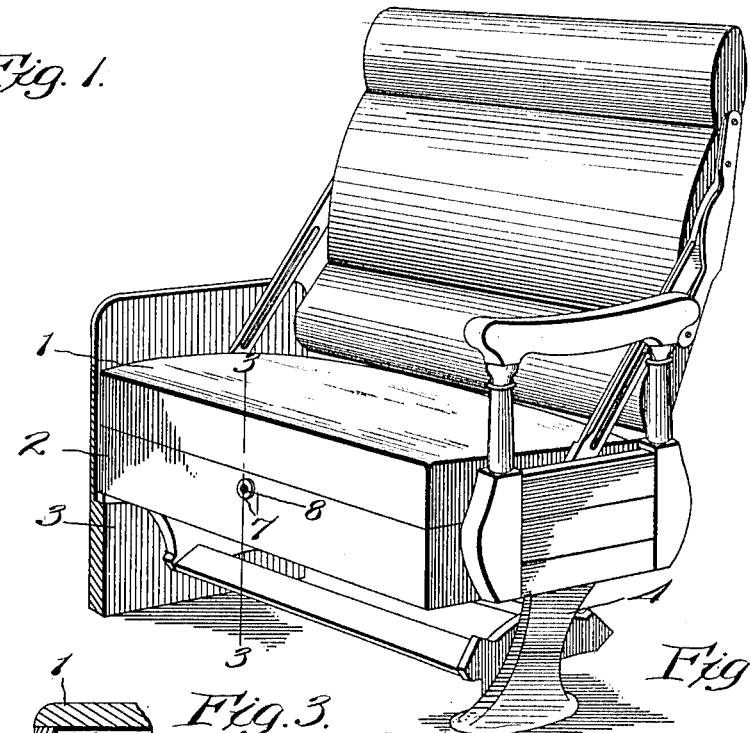
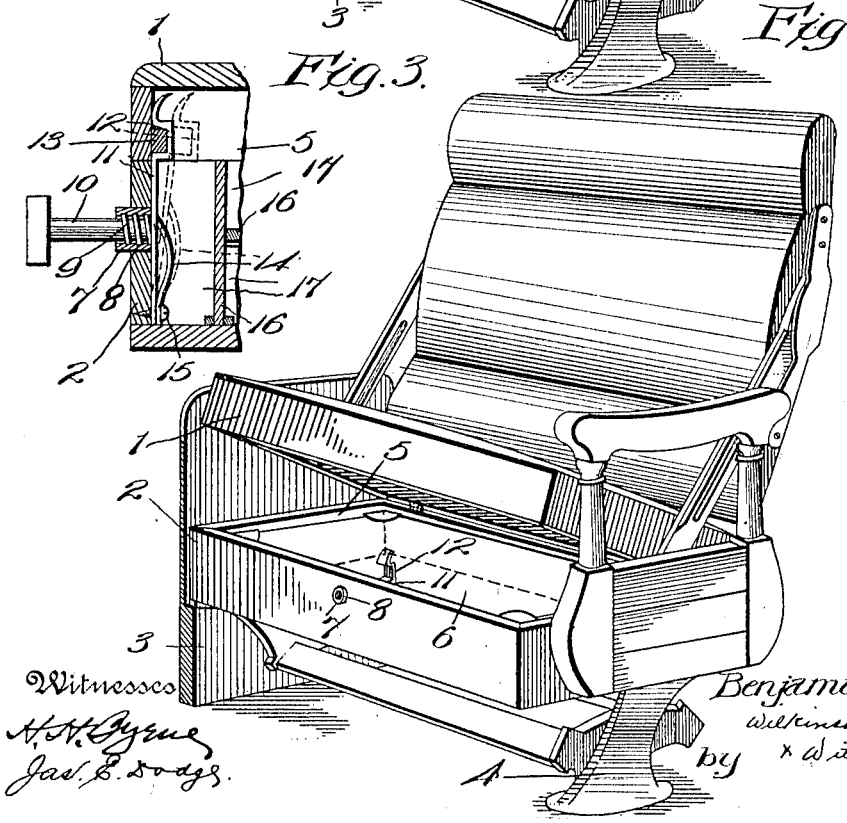
Witnesses
H. H. Byrne
Jas. E. Dodge
Inventor
Benjamin F. Ford
by Wilkinson Fisher
& Witherspoon
Attorneys
COLUMBIA PLANOGRAPH CO., WASHINGTON, D. C.

UNITED STATES PATENT OFFICE.

BENJAMIN F. FORD, OF THE UNITED STATES ARMY.

COVER-FASTENER.

1,073,482.

Specification of Letters Patent.

Patented Sept. 16, 1913.

Application filed February 12, 1912. Serial No. 676,936.

*To all whom it may concern:*

Be it known that I, BENJAMIN F. FORD, Company H, Twenty-fifth United States Infantry, a citizen of the United States, stationed at Fort George Wright, Spokane, in the county of Spokane and State of Washington, have invented certain new and useful Improvements in Cover-Fasteners; and I do hereby declare the following to be a full, clear, and exact description of the invention, such as will enable others skilled in the art to which it appertains to make and use the same.

This invention relates to combined seats and receptacles, especially seats in coaches of passenger trains and wherein a receptacle is locked and guarded through the occupancy of the seat by the passenger.

The invention has for a further object the production of such a device which will be simple in construction and comparatively inexpensive to install.

With these and other objects in view the invention consists in the novel details of construction and combinations of parts more fully hereinafter disclosed and particularly pointed out in the claim.

Referring to the accompanying drawings forming a part of this specification in which like numerals designate the same parts in all the views: Figure 1 is a perspective view of a car seat with my invention applied; Fig. 2, a perspective view of a car seat, with the upper part raised to more clearly show my invention; and Fig. 3 is a fragmentary section view taken on the lines 3—3 of Fig. 1, showing my improved locking mechanism and partitioning arrangement.

1 represents any suitable coach seat in a railway car hingedly connected to a section 2 that is supported in the usual manner by the supports 3 and 4. The section 2 provides a receptacle 5 in which the passenger may put any articles for safe keeping. At the present time there is great inconvenience to the passenger in being unable to put certain traveling articles on the seat by his side, and in the event of placing such articles on the rack overhead results many times in the falling and injury to the passenger. In the present instance, a suit-case 6 is shown as stored within this receptacle 5.

The body portion of the seat 1 and section 2 may be locked by any suitable means, but in the present invention I have shown a collar 7 with the female threads 8 which receive the threads 9 of the key 10. When the key 10 is inserted it strikes a resilient latch 11 in which is formed the squared recess 12, for engaging with a lug 13 located upon the body portion of the seat 1, and thereby disengages the squared recess 12 from the lug 13, thus pushing the latch 11 into the dotted line position, as shown in Fig. 3. A bowed spring 14 fastened by a set screw 15 to the latch 11 and section 2 tends to return the recess 12 to hold the latch 11 in engaging position to lock the seat 1 to the section 2 when the key 10 is withdrawn.

It is therefore evident that those skilled in the art may vary the details of construction and the arrangement of parts without departing from the spirit of my invention.

What I claim is:—

In a fastener for hinged receptacle lids, the combination of a square lug projecting from the inner face of the front wall of the lid; a coöperating latch carried by the receptacle portion and comprising a piece of resilient material having a square recess formed therein in proximity to the upper end thereof and a deflected end portion above the recess, said deflected portion adapted to be engaged by said lug and move said latch inwardly until the lug enters the recess; a relatively short bow spring for normally tending to hold the latch in engagement with the lug; a screw passing through said spring and latch in proximity to the lower ends thereof, and threaded into the front wall of the receptacle; and means for releasing said latch, said means comprising an interiorly threaded collar fitted in the front wall of the receptacle, and a headed key having a threaded end portion engaging with the threads in said collar and adapted to be screwed inwardly to engage said latch to move the same to disengage said lug.

In testimony whereof, I affix my signature, in presence of two witnesses.

BENJAMIN F. FORD.

Witnesses:
A. G. METZ,
CHARLES CARR.

Copies of this patent may be obtained for five cents each, by addressing the "Commissioner of Patents, Washington, D. C."